US 8,811,298 B2

(12) United States Patent
Gaal et al.

(10) Patent No.: US 8,811,298 B2
(45) Date of Patent: Aug. 19, 2014

(54) METHOD AND APPARATUS FOR UTILIZING UNUSED RESOURCES IN A WIRELESS COMMUNICATION SYSTEM

(75) Inventors: Peter Gaal, San Diego, CA (US); Wanshi Chen, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 608 days.

(21) Appl. No.: 12/540,622

(22) Filed: Aug. 13, 2009

(65) Prior Publication Data
US 2010/0040009 A1    Feb. 18, 2010

Related U.S. Application Data

(60) Provisional application No. 61/089,042, filed on Aug. 14, 2008.

(51) Int. Cl.
*H04W 4/00* (2009.01)

(52) U.S. Cl.
USPC ............ 370/329; 370/280; 455/450; 709/236

(58) Field of Classification Search
USPC ......... 370/329, 335, 342, 252, 343, 344, 229, 370/230, 280, 336, 412, 264; 455/450, 464, 455/522; 709/227, 235, 236
See application file for complete search history.

(56) References Cited

U.S. PATENT DOCUMENTS

| 2007/0097981 | A1 | 5/2007 | Papasakellariou |
| 2008/0049690 | A1 | 2/2008 | Kuchibhotla et al. |
| 2010/0329220 | A1* | 12/2010 | Kim et al. ............ 370/336 |

FOREIGN PATENT DOCUMENTS

| WO | WO2008006088 | 1/2008 |
| WO | WO2008041089 | 4/2008 |
| WO | 2008084624 A1 | 7/2008 |
| WO | WO2008092160 | 7/2008 |

OTHER PUBLICATIONS

3GPP TSG RAN WG1 #53bis, R1-082438, LG Electronics Inc., "Efficient Utilization of Unused PUCCH RB", Jun. 30-Jul. 4, 2008, Warsaw, Poland.
3rd Generation Partnership Project; Technical Specification Group Radio Access Network; Evolved Universal Terrestrial Radio Access (E-UTRA); Physical Channels and Modulation (Release 8), 3GPP TS 36.211 V8.3.0. May 2008.
3rd Generation Partnership Project; Technical Specification Group Radio Access Network; Evolved Universal Terrestrial Radio Access (E-UTRA); Physical layer procedures (Release 8), 3GPP TS 36.213 V8.3.0, May 2008.
International Search Report and Written Opinion—PCT/US2009/053920—ISA/EPO—Dec. 18, 2009.
Samsung Electronics "LTE PHY Spec" [online] Jun. 24, 2008 pp. 01-77, XP002558928.

(Continued)

*Primary Examiner* — Dady Chery

(57) ABSTRACT

Systems and methodologies are described that facilitate allocating uplink resources in a wireless access terminal. When a downlink transmission is received at a wireless device, the wireless device determines the appropriate control region to reserved based in part on the downlink transmission. Uplink data resources are also dynamically assigned.

24 Claims, 11 Drawing Sheets

(56) References Cited

OTHER PUBLICATIONS

Ericsson "Introducing missing L1 parameters into 36.213" 3GPP Draft; R1-082734 {Draft CR36.213 Missing L1 parameters}, Jul. 6, 2008 3rd Generation Partnership Project (3GPP), Mobile Competence Centre ; 650, route des Lucioles ; F-06921 Sophia-Antipolis Cedex ; France Vol:RAN WG1, Nr:Warsaw, Poland; Jul. 6, 2008; XP050110962.

Taiwan Search Report—TW098127450—TIPO—Aug. 10, 2012.
"3rd Generation Partnership Project; Technical Specification Group Radio Access Network; Evolved Universal Terrestrial Radio Access (E-UTRA); Multiplexing and channel coding (Release 8)" 3GPP Standard; 3GPP TS 36.212, 3rd Generation Partnership Project (3GPP), Mobile Competence Centre; 650, Route Des Lucioles ; F-06921 Sophia-Antipolis Cedex France, No. V8.3.0, May 1, 2008, pp. 1-48, XP050377549, p. 33.

* cited by examiner

METHOD AND APPARATUS FOR UTILIZING UNUSED RESOURCES IN A WIRELESS COMMUNICATION SYSTEM

CLAIM OF PRIORITY UNDER 35 U.S.C. §119

The present application for patent claims priority to Provisional Application No. 61/089,042 entitled "A Method and Apparatus for Utilizing Unused Resources in a Wireless Communication System" filed Aug. 14, 2008, and assigned to the assignee hereof and hereby expressly incorporated by reference herein.

BACKGROUND

1. Field

This application related generally to wireless communications, and more particularly to allocating resources for control and data transmissions.

2. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Control channels and data channels may be used to transmit information in certain communication systems. In some communications systems, such as LTE, a resource grid is used to describe a slot used to transmit a signal. A resource block may include a plurality of resource elements. A group of resource elements is known a resource block. Currently, the number of resource blocks used for transmitting control information (i.e., a control region) is configured by higher layers in an LTE wireless device protocol stack. However, the number of resource blocks actually needed for control information is variable, and may depend, for example, on a transmission received on the downlink. Thus, statically defining a control region is not efficient as it may lead to a waste of resources.

Moreover, if an odd number of resource blocks are reserved for control information, data may overlap the control information in the control region. Currently, the LTE specifications indicate that data overlapping a control region cannot be transmitted on the same channel as control information. However, as resource blocks in a control region may be reserved but not used, resources may be wasted by prohibiting data traffic from being transmitted at the reserved, unused control channel. It would be desirable to have systems and methods to address these and other shortcomings.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to some aspects, method of allocating uplink (UL) resources in a wireless access terminal (AT), comprises receiving a downlink (DL) transmission; determining a number of control symbols used in the DL transmission; and reserving a UL control region based, at least in part, on the number of control symbols used in the DL transmission.

According to some aspects, an apparatus comprises means for receiving a downlink (DL) transmission; means for determining a number of control symbols used in the DL transmission; and means for reserving a UL control region based, at least in part, on the number of control symbols used in the DL transmission.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. SC-FDMA is currently included in LTE Rel-8, for uplink multiple access scheme in 3GPP Long Term Evolution (LTE), or Evolved UTRA and the single carrier waveform is expected to be maintained in future releases.

Figure 1:
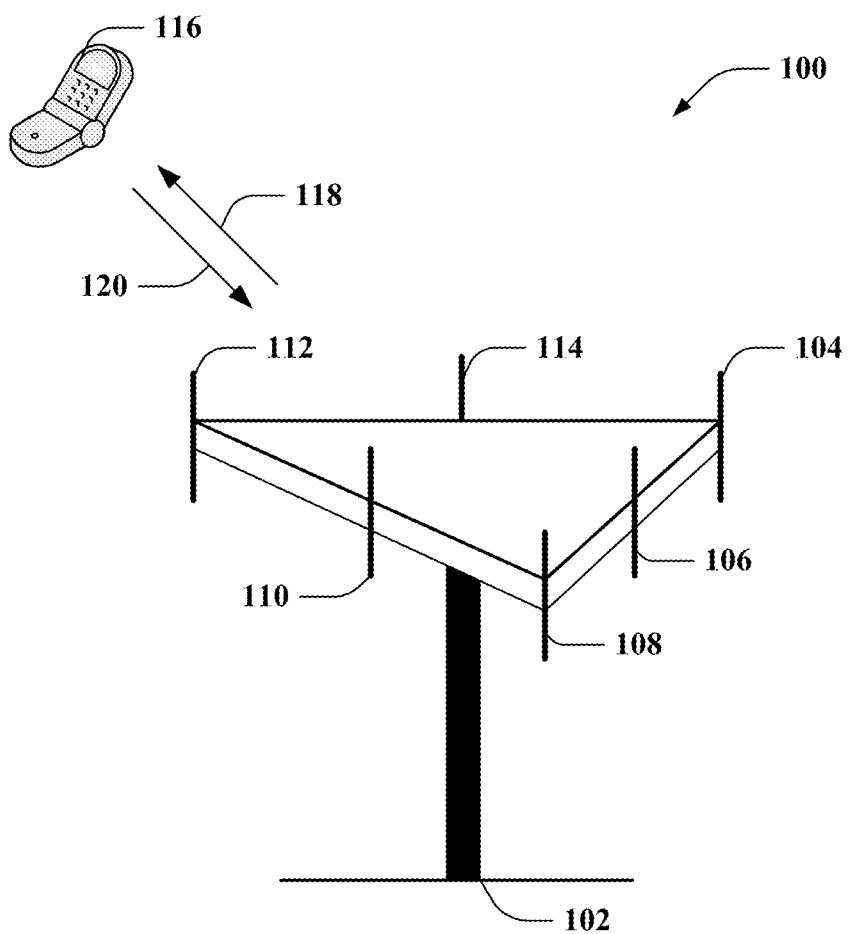
FIG. 1 illustrates a multiple access wireless communication system.

Referring to FIG. 1, a wireless communication system 100 which may implement various disclosed aspect is illustrated. Wireless communication system 100 may implement, for example, protocols specified by 3GPP LTE. An access point 102 (AP) may include multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Each group of antennas and/or the area in which they are designed to communicate is often referred to as a sector of the access point. In the embodiment, antenna groups each are designed to communicate to access terminals in a sector, of the areas covered by access point 100.

An AP may be a fixed station used for communicating with the terminals and may also be referred to as an access node, a Node B, or some other terminology. An AT may also be called a terminal, user equipment (UE), a wireless communication device, or some other terminology.

Figure 2:
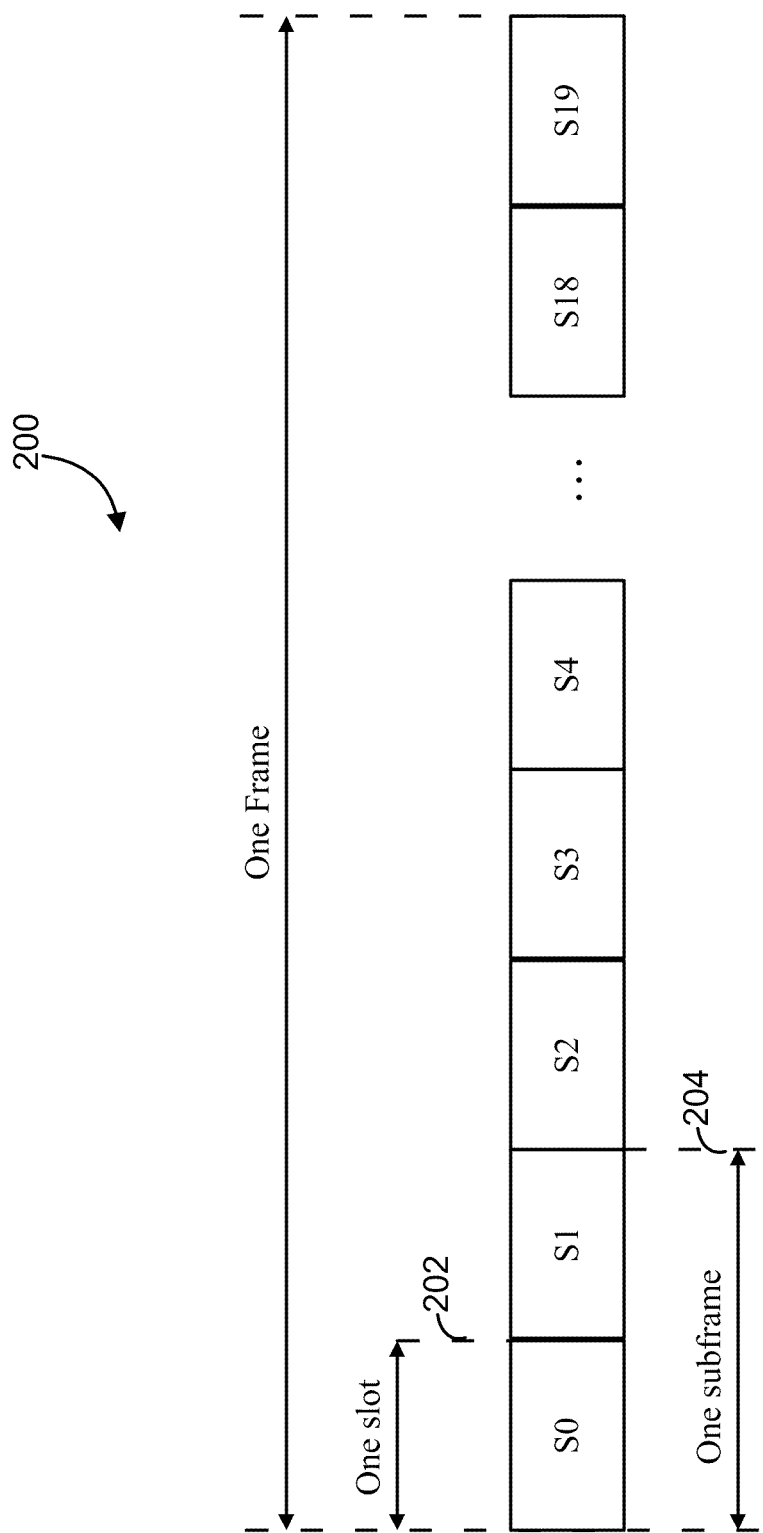
FIG. 2 depicts an exemplary LTE frame structure.

FIG. 2 depicts an exemplary frame structure of an LTE frame 200. LTE frame 200 may be used for uplink and downlink physical layer transmissions. LTE frame 200 may be 10 ms in length and may comprise 20 slots 202. As depicted in FIG. 2, slots 202 are numbered S0 through S19. Each slot 202 is 0.5 ms in length. Two consecutive slots 202 are known as a subframe, as depicted at 204. Thus, LTE frame 200 comprises 10 subframes. It is noted that LTE frame 200 is merely an exemplary LTE frame structure that may be used for full duplex and half duplex FDD. Other frame types/structures may also be applied such as, for example, the TDD frame structure described in 3GPP TS 36.211, the contents of which are incorporated herein by reference.

As used herein, downlink (DL) refers to communications originating from an AP towards an AT. In LTE, there are several DL physical channels. For example, a physical downlink control channel (PDCCH) may carry control information including a resource allocation of control messages of the upper layers, resource allocation for the physical downlink shared control channel (PDSCH), uplink (UL) scheduling grants informing an AT of resource allocation of an uplink transmission, and/or other control information. A physical control format indicator channel (PCFICH) may be provided to inform an AT of the number of OFDM symbols used for the PDCCH. Additionally, a physical hybrid ARQ indicator channel (PHICH) may be provided to carry HARQ ACK/NAK signals. Other DL control signals may also be included.

As used herein, uplink refers to communications originating at an AT and destined for an AP. Like DL communications, UL communications also include multiple control signals. The physical uplink control channel (PUCCH) carries uplink control information such as, for example, ACK/NACK information related to data packets received on the downlink, channel quality indication (CQI) reports, scheduling requests (SR), and/or other control information. The physical uplink shared channel (PUSCH) may be used for UL data transmission.

Figures 3A, 3B:
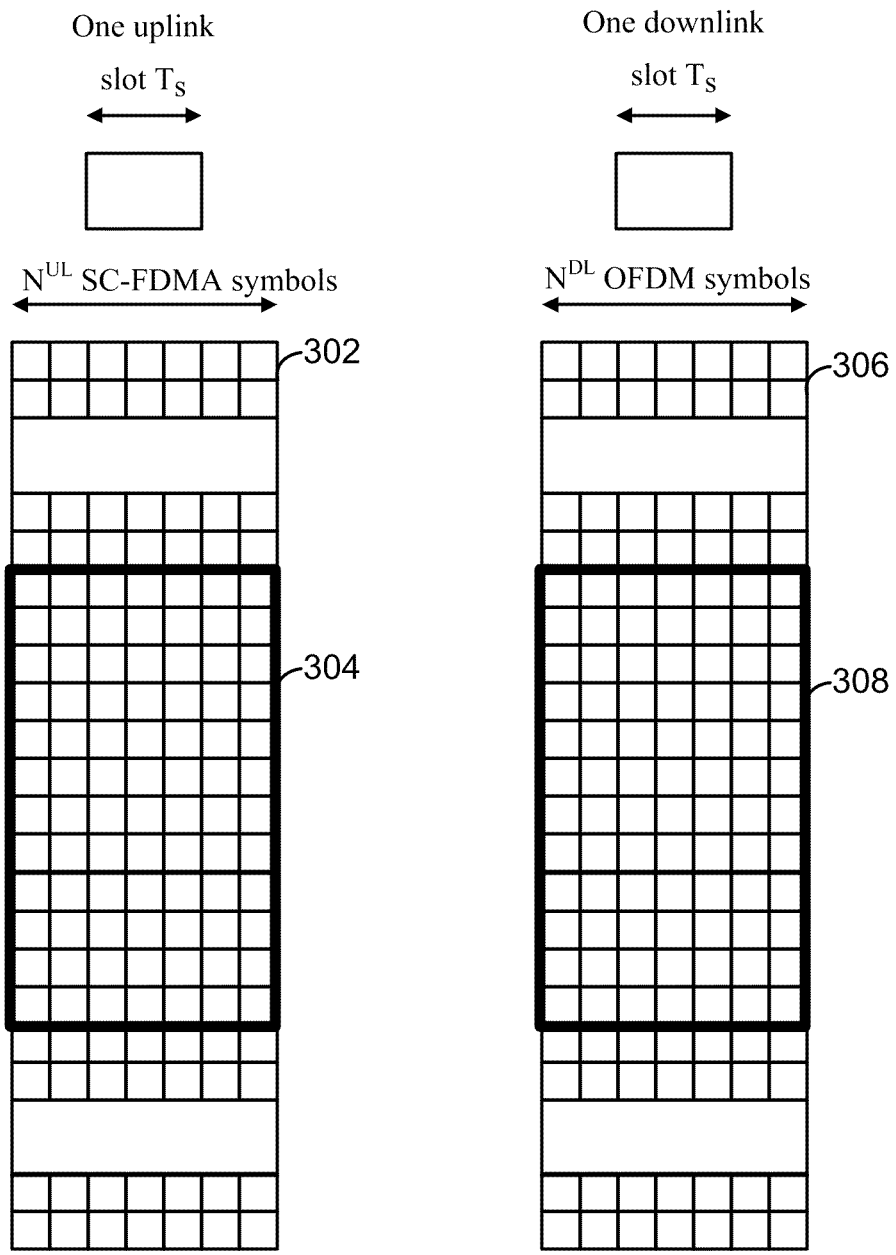
FIG. 3 depicts resource grids for uplink and downlink communications.

Both UL and DL transmission signals in each slot may be described by a resource grid. FIGS. 3A and 3B depict resource grids that may be used to describe an UL transmitted signal and a DL transmitted signal, respectively. As depicted in FIG. 3A, one uplink slot may comprise a grid of $N_{RB}^{UL}$ $N_{sc}^{RB}$ subcarriers and $N_{symb}^{UL}$ SC-FDMA symbols, wherein $N_{sc}^{RB}$ refers to the resource block size in the frequency domain, expressed as a number of subcarriers, and $N_{symb}^{UL}$ refers to the number of SC-FDMA symbols in an uplink slot. The quantity $N_{RB}^{UL}$ depends on the uplink transmission bandwidth configured in the cell. Each resource element 302 in UL resource grid 310 is referred to as a resource element. UL resource grid 310 may comprise a plurality of resource blocks, one of which is depicted at 304. A resource block, such as resource block 304, may be defined as $N_{symb}^{UL}$ consecutive SC-FDMA symbols in the time domain and $N_{sc}^{RB}$ consecutive subcarriers in the frequency domain. The number of resource elements 302 in a resource block depends, at least in part, on the cyclic prefix used for a transmission. For example, when a normal cyclic prefix is used, a resource block may comprise 12 consecutive subcarriers and 7 consecutive SC-FDMA symbols. When an extended cyclic prefix is used, a resource block may comprise 12 consecutive subcarriers and 6 consecutive SC-FDMA symbols. Resource block 304 is an example of a resource block for a transmission using the normal cyclic prefix.

DL resource grid 320 is a grid of $N_{RB}^{DL}$ $N_{sc}^{RB}$ and $N_{symb}^{DL}$ OFDM symbols. Resource grid 320 may comprise a plurality of resource elements 306 and resource blocks 308. Resource blocks 308 may be used to describe the mapping of certain physical channels to resource elements 306. Similar to UL resource blocks, the number of DL symbols in a resource block 308 may be 7 if a normal cyclic prefix is used or 6 if an extended cyclic prefix is used.

Figure 4:
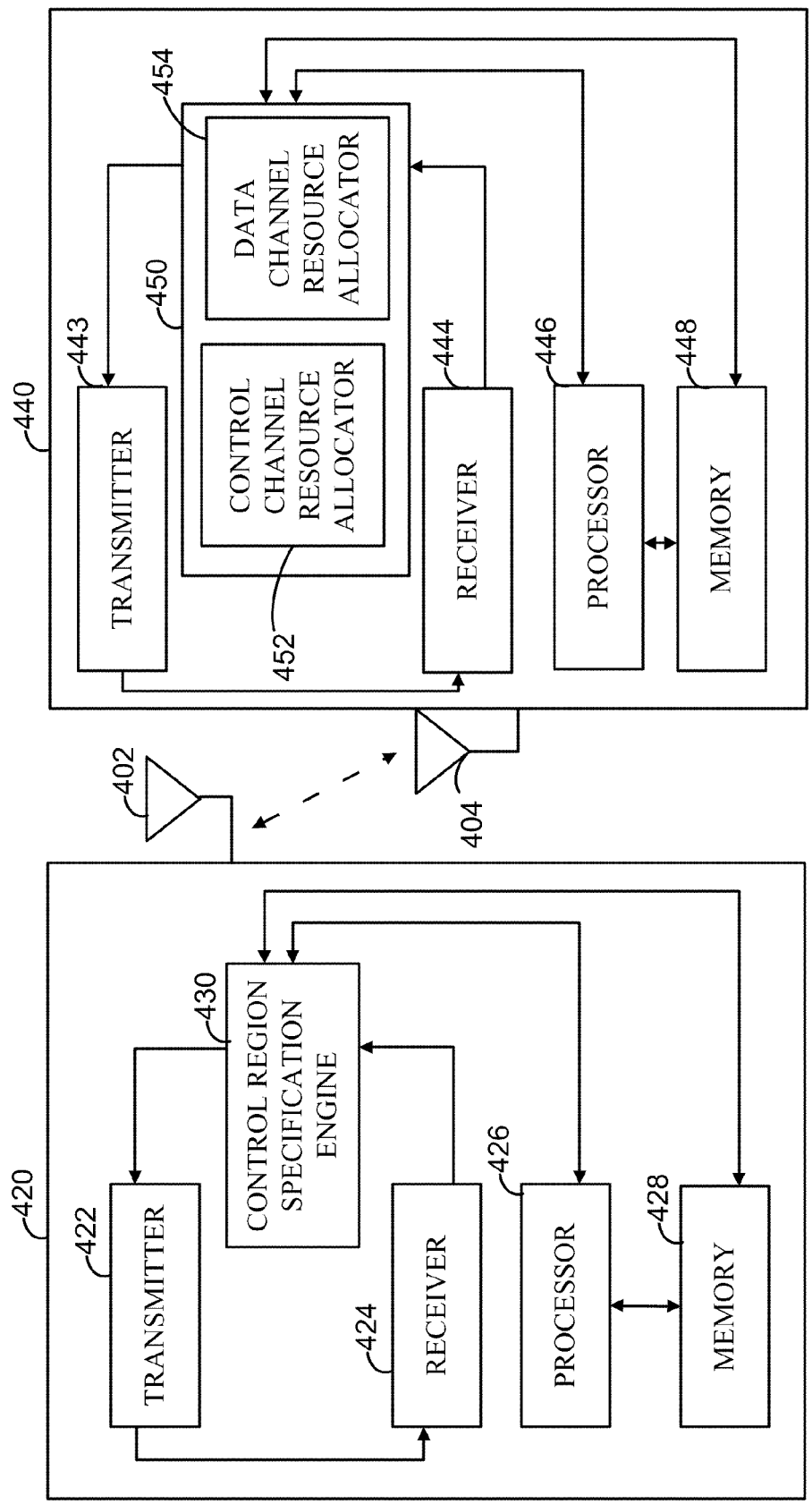
FIG. 4 depicts an exemplary communication system implementing various disclosed aspects.

Resource blocks, such as resource blocks 310 and 320 may be used to map data and control transmissions to resource elements. Typically, control channel resources are mapped to the edges of a subframe while data transmissions are transmitted using the remaining portions of a subframe. FIG. 4 depicts an exemplary communications system 400 for allocating data and control channel resources. System 100 may comprise one or more APs 420 and one or more ATs 440. While only one AP 420 and one AT 440 is illustrated in FIG. 4, it should be appreciated that system 400 may include any suitable number of APs 430 and ATs 440.

AP 430 and AT 440 may perform UL and DL communications via one or more antennas 402 and 404. For example, a DL transmission may originate at AP 420 via a transmitter 422. More particularly, transmitter 422 may generate or otherwise obtain control signaling and/or other information intended for terminal 440. This information can then be transmitted on the DL via transmitter 420 and antenna 402, where it can be received by receiver 444 at AT 440 via antenna 404. AP 420 further comprises a processor 426 and a memory 428, which may be used by AP 420 to implement various aspects described herein. For example, processor 426 may be configured to instruct control region generating engine 430 to generate the appropriate control signals. It is noted that while control region generating engine 430 is depicted separately from processor 426, those of ordinary skill in the art would recognized that the functions performed by control region generating engine 430 are typically integrated with a processor. Thus, control region generating engine 430 may be a software module forming part of processor 426.

Control region generating engine 430 may be configured to generate control information to be transmitted to AT 440. The control information may be used by AT 440 to allocate resources for its control and data transmissions. Control region generating engine 430 may generate, for example, a PDCCH transmission which may carry an uplink scheduling grant, informing AT 440 of its resource allocation for uplink transmission. Control region generating engine 430 may further generate a PDFICH transmission which may indicate the number of control symbols used in the PDCCH. Control region generating engine 430 may also generate other control information. Transmitter 420 may transmit the generated control information to AT 440.

AT 440 comprises a receiver 444 that receives transmissions from AP 420 via antenna 404. AT 440 may further comprise resource allocation engines 450 that may be configured by processor 446 to allocate physical layer resources based on control information received from AP 420. Resource allocation engines 450 may include a control channel allocator 452 and a data channel allocator 454. Control channel allocator 452 may be configured to dynamically set a dynamic PUCCH control region based on the actual number of OFDM symbols used for control in a DL transmission. Resources may then be mapped to resource blocks based on the actual needs, thereby increasing efficiency. According to some aspects, control channel allocator 452 may consult a mapping table based on the downlink transmission parameters to determine the appropriate configuration. In other aspects, control channel allocator 452 may implicitly derive the appropriate configuration.

Data channel resource allocator 454 may be configured to map data resources to resource blocks. According to some aspects, data channel resource allocator 454 may be configured to reuse reserved, yet unused, PUCCH resources for PUSCH data transmissions. The data channel resource allocator 454 may be configured to determine a data resource mapping based on whether the number of resource blocks reserved for UL control is odd or even.

AT 440 further comprises a transmitter 440 for transmitting data and control information to AN 420 or other ATs via antenna 404. As in AN 420, a memory 448 is provided in AT 440 for implementing various disclosed aspects.

Figure 5:
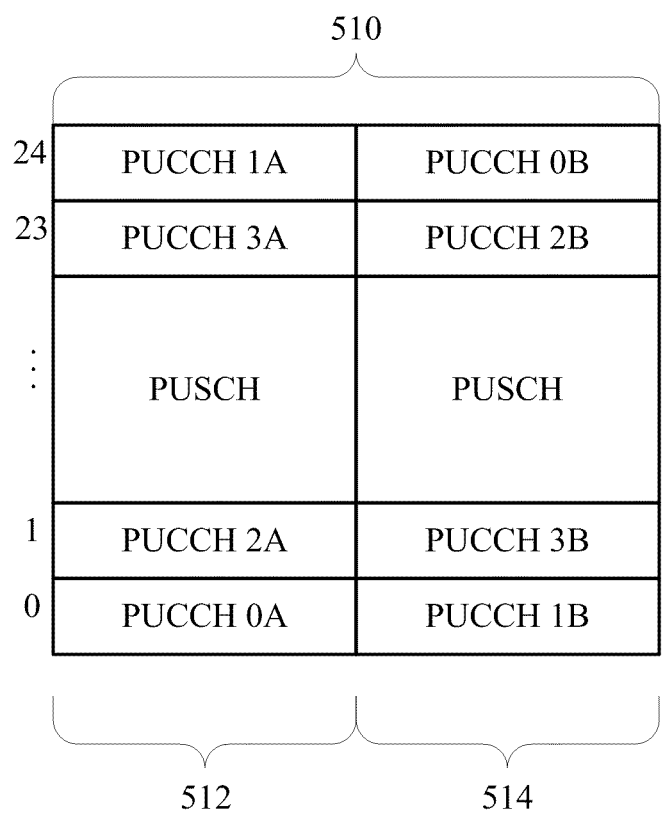
FIG. 5 depicts an exemplary symbol allocation for uplink communications.

FIG. 5 depicts a typical allocation of UL resource blocks. The signaling structure depicted in FIG. 5 may be conducted over one or more subframes 510, each of which may comprise two slots 512 and 514. As depicted in FIG. 5, PUCCH control channels are typically allocated to those frequency regions at the edges of the system bandwidth. To exploit frequency diversity, PUCCH signals are typically transmitted using mirror hopping. That is, each PUCCH control symbol may be transmitted in one slot at first edge of the bandwidth and is a second slot at the opposite edge of the bandwidth. For example, PUCCH control symbol 0 may be transmitted in slot 1 at frequency 0 (shown as PUCCH 0A) and in slot 0 at frequency 24 (shown as PUCCH 0B). PUCCH control symbols 2 and 3 are similarly arranged.

Those areas not reserved for PUCCH control symbol transmission may be used for PUSCH data transmission. PUSCH symbols are typically transmitted on two slots in the same frequency. For example, as depicted in FIG. 5, a first PUSCH data symbol may be transmitted using both slot 0 and slot 1 at frequency 3.

Control signaling carried via a PUCCH channel may comprise scheduling requests, HARQ ACK/NACK messages in response to DL data packets transmitted on the PDSCH, channel quality indicators (CQIs), and/or other control signals. Static or semi-static control signals, such as CQIs and scheduling requests are typically arranged at the edges of a designated bandwidth. ACK/NACK messages, depending on the type, may be semi-statically allocated or may be allocated dynamically. For example, ACK/NAK messages received in response to dynamic DL assignments may be dynamically mapped while those received in response to semi-persistent scheduling assignments may be configured by layer 3 and semi-statically allocated. Resources for these and other dynamic control signals are allocated after the semi-static controls, moving inward in the designated bandwidth region. According to some exemplary aspects of the systems and methods described herein, the dynamic region may be allocated based on the actual number of DL control symbols. In contrast to the typical resource allocation, as specified by the 3GPP LTE specifications, where allocation is based solely on the number of PUCCH resource blocks defined by the upper layers, efficiency can be increase by reserving resources based on the actual needs, as reflected by a DL transmission.

Figure 6:
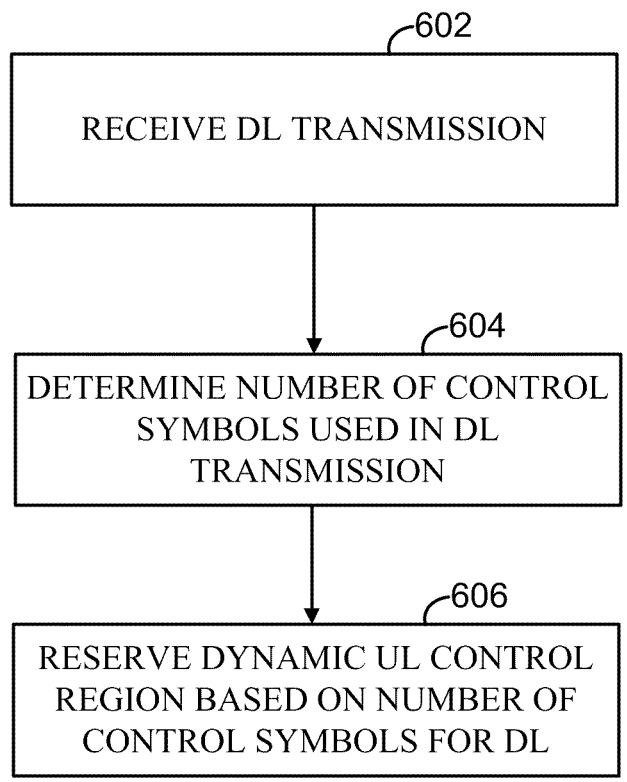
FIG. 6 is a flowchart depicting a method of allocating uplink control resources.

FIG. 6 is a simplified flowchart depicting a process 600 for defining a dynamic PUCCH control region. As depicted at 602, an AT may receive a DL transmission from an AP. The transmission may include various control channels, such as the PCFICH and the PDDCH described herein.

As depicted at 604, the AT may determine the number of control symbols used for the DL transmission. This information may be used to allocate PUCCH resources. According to some aspects, there may be a finite number of possible control symbols configured on the DL. For example, the DL may configure 1, 2, 3, or 4 control symbols depending on the bandwidth of the DL communications channel. For example, communications channels having a small bandwidth (e.g., less than 10 RBs) may be configured to transmit 2, 3, or 4 control symbols while those having a larger bandwidth may be configured to transmit 1, 2, or 3 control symbols. The PCFICH may be configured to indicate the number of OFDM symbols for control. As such, the AT may determine the number of control symbols by referring to the PCFICH.

As depicted at 606, the AT may reserve a dynamic PUCCH control region based, at least in part, on the determined number of control symbols. According to some aspects, higher layers may maintain a mapping of possible control regions to the number of DL control symbols. That is, both the AT and AP are aware of the finite number of control symbols configurable in a DL slot. The higher layers may maintain a first parameter $N_{RB,1}^{PUCCH}$ indicating the dynamic control region to be reserved if 1 control symbol is configured on the DL, a second parameter $N_{RB,2}^{PUCCH}$ indicating the dynamic control region to be reserved if 2 control symbols are configured on the DL, and a third parameter $N_{RB,3}^{PUCCH}$ indicating the dynamic control region to be reserved if 3 control symbols are used.

Thus, upon determining the number of control symbols, as indicated by the PCFICH, the higher layers may explicitly direct the physical layer to reserve the designated control region. According to some aspects, the AT may implicitly derived the dynamic control region for a particular subframe based on the PCFICH value and other parameters. For example, the following formula may be used:

$$N_{RB}^{PUCCH}(n) = N_{RB}^{(2)} + \left\lceil \frac{N_{PUCCH}^{(1)} + N_{CCE,n-k} - N_{CS}^{(1)}/\Delta_{shift}^{PUCCH}}{cN_{sc}^{RB}/\Delta_{shift}^{PUCCH}} \right\rceil + \lceil N_{CS}^{(1)} \rceil \quad (1)$$

Thus, the number of PUCCH resource blocks at a subframe n may be derived based on the PCFICH value at subframe n-k and the higher layer configurations of the bandwidth reserved for PUCCH formats 2/2a/2b ($N_{RB}^{(2)}$) the number of cyclic shifts used for PUCCH formats 1/1a/1b in a resource block with a mix of formats 1/1a/1b and 2/2a/2b ($N_{CS}^{(1)}$), the resource block size in the frequency domain ($N_{sc}^{RB}$), and/or other parameters.

As described above in reference to FIG. 4, PUCCH symbols are typically arranged at the edge of a frame. PUSCH resources allocated by an AP may fall within a reserved PUCCH region. As currently defined in the 3GPP LTE specification, if an odd number of RB pairs have been configured for PUCCH transmissions and an AT's PUSCH resource allocation includes RBs at a carrier band edge, the RB of the allocated PUSCH band edge RB pair occupied by the PUCCH resource slot will not be used for PUSCH. That is, if the number of PUCCH resources configured is odd and the assigned PSUCH resource and PUCCH region is overlapped by 1 RB, the overlapped RB shall not be used for PUSCH. An example of this is depicted in FIG. 7.

Figure 7:
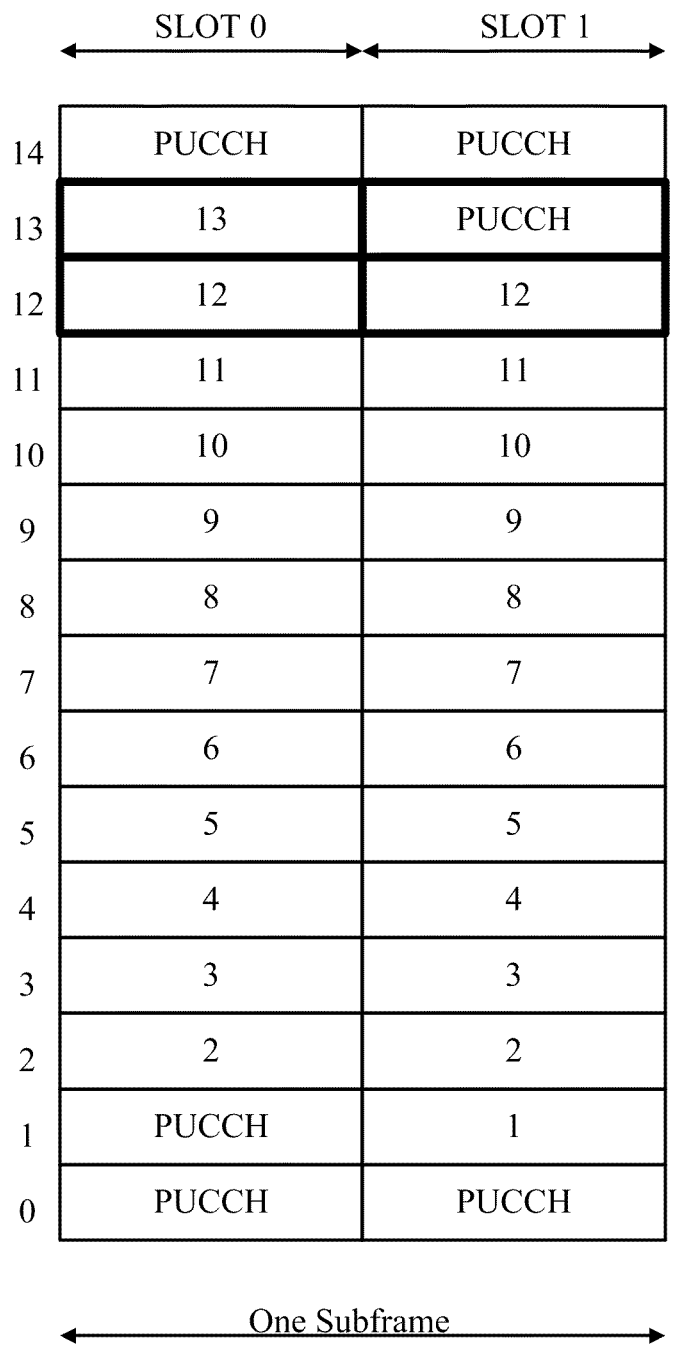
FIG. 7 depicts an exemplary symbol allocation for uplink communications.

As depicted in FIG. 7, a non-hopping PUSCH transmission is assigned in RBs 12 and 13. However, there is a collision with the PUCCH region at RB 13 in slot 0. As such, this PUSCH transmission can only be allowed on RB slot 1. The lack of an RB pair to transmit at slot 13 may negatively impact PUSCH performance as one code block may only exist with one RB. Moreover, while RBs 13 and 14 have been reserved for PUCCH, it is possible that only the first PUCCH pair is active. In this case, the PUSCH transmission is still prohibited and resources are wasted.

Figure 8:
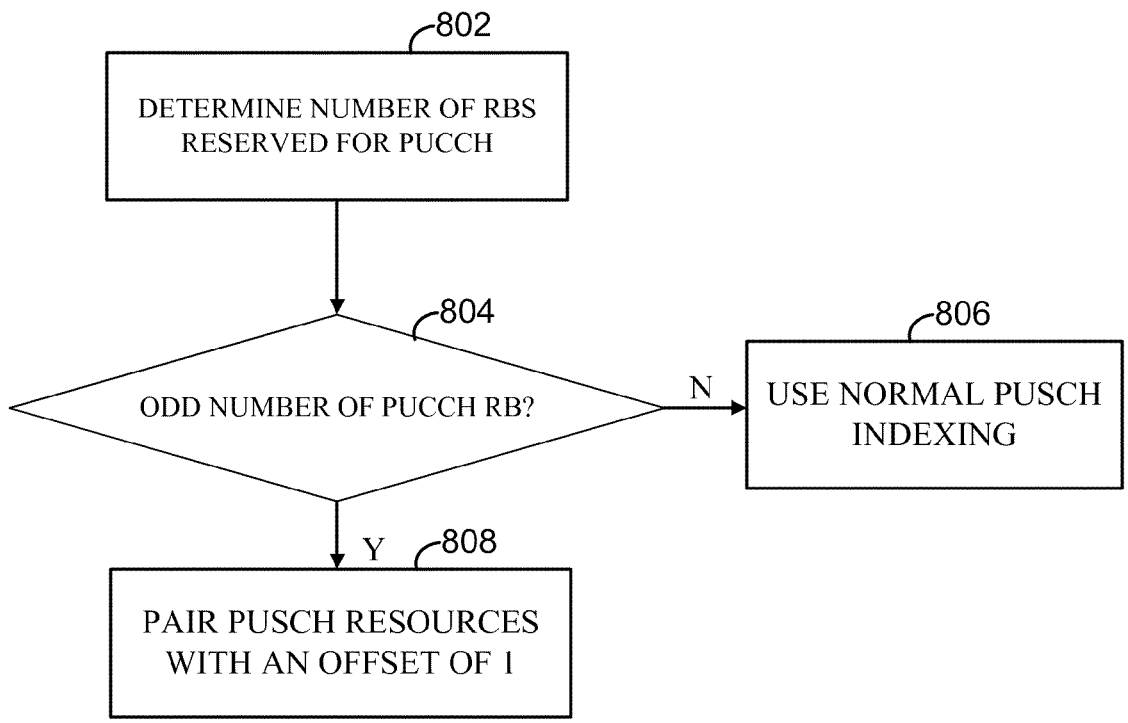
FIG. 8 is a flowchart depicting a method for allocating control and data resources.

FIG. 8 depicts one exemplary method of reusing reserved PUCCH resources for PUSCH transmissions. An AT may first determine the number of RBs reserved for PUCCH, as depicted at 802. As described above, the PUCCH resource allocation may be explicitly configured by higher layers, or may be derived by the physical layer based on various parameters. As depicted at 804, the AT next determines whether the number of PUCCH RBs is odd. If the number of PUCCH RBs is not odd, as depicted at 806, normal PUSCH indexing may be used to assign the PUSCH resources. For example, PUSCH symbols may be transmitted in two slots at the same frequency.

Figure 9:
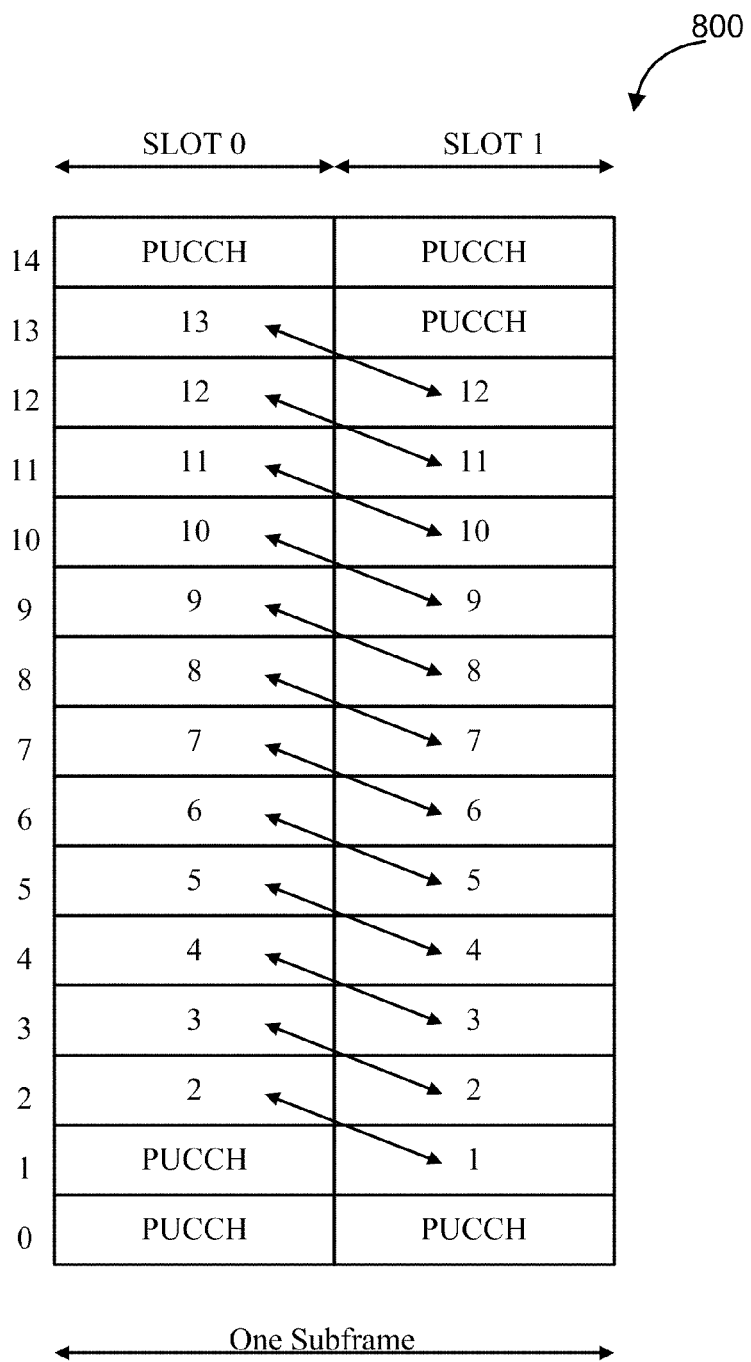
FIG. 9 depicts an exemplary symbol allocation for uplink communications.

If an odd number of RBs have been reserved for PUCCH, the AT may pair the PUSCH resources with an offset of 1. This is depicted in FIG. 9. PUSCH symbol 2, at frequency 2, is transmitted in slot 0 along with PUSCH symbol, at frequency 1, in slot 1. While the PUSCH transmissions are offset by 1, integer multiples of RB pairs are maintained.

Figure 10:
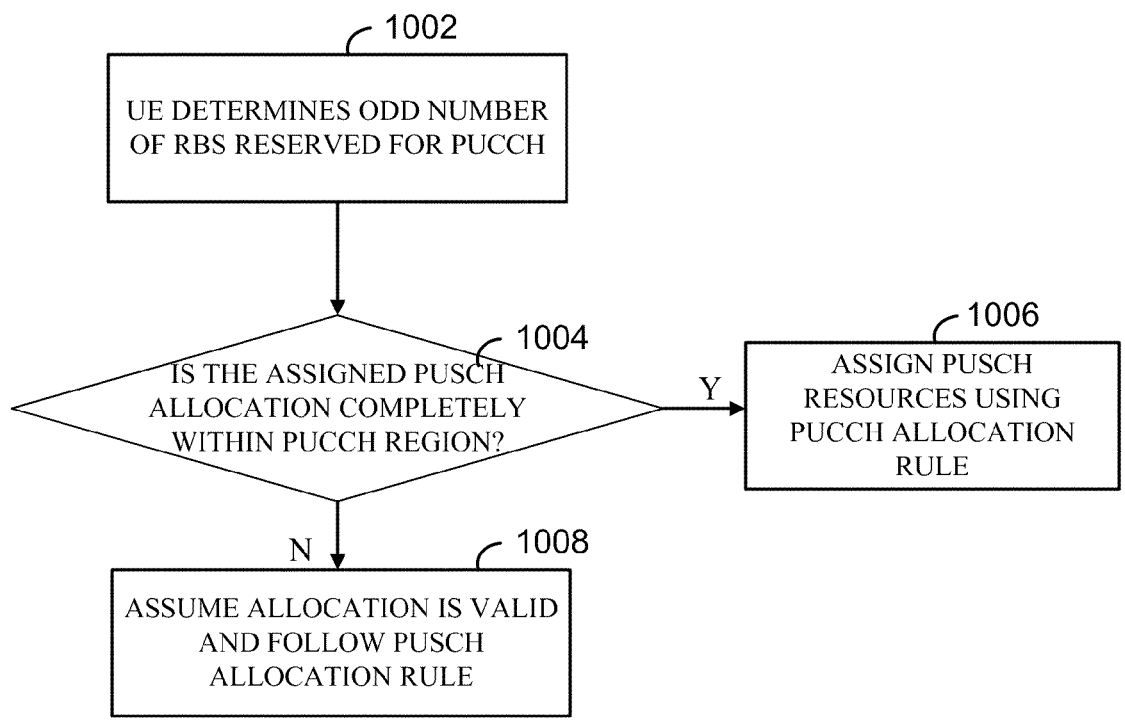
FIG. 10 is a flowchart depicting a method for allocating control and data resources.

FIG. 10 is a flowchart depicting another exemplary method of reusing reserved PUCCH resources for PUSCH transmission. The process 1000 begins at 1002 when the AT determines that an odd number of RBs have been reserved for PUCCH. As depicted at 1004, the AT determines whether the assigned PUSCH allocation is completely within the PUCCH region. More particularly, the AT determines whether there PUSCH allocation is entirely contained in the PUCCH region, or whether the PUSCH allocation includes both PUCCH and PUSCH regions.

If the PUSCH allocation is completely within the PUCCH region, the PUSCH resources may be allocated using the configured PUCCH allocation rule, as depicted at 1006. As described herein, PUCCH resources are typically allocated using mirror hopping. Accordingly, the PUSCH resources would also be allocated using mirror hopping.

As depicted at 1008, if the assigned PUSCH allocation is not completely within the PUCCH region, the AT may assume the allocation is valid and follow the configured PSUCH allocation rules. That is, the AT may follow the instructions of the AP and allocate the PUSCH resources. According to some aspects, the AT may be configured to allocate the PUSCH resources in an offset manner, as depicted in FIG. 8. In other aspects, the AT may be configured to assign the PUSCH resources to slots in the same RB.

Figure 11:
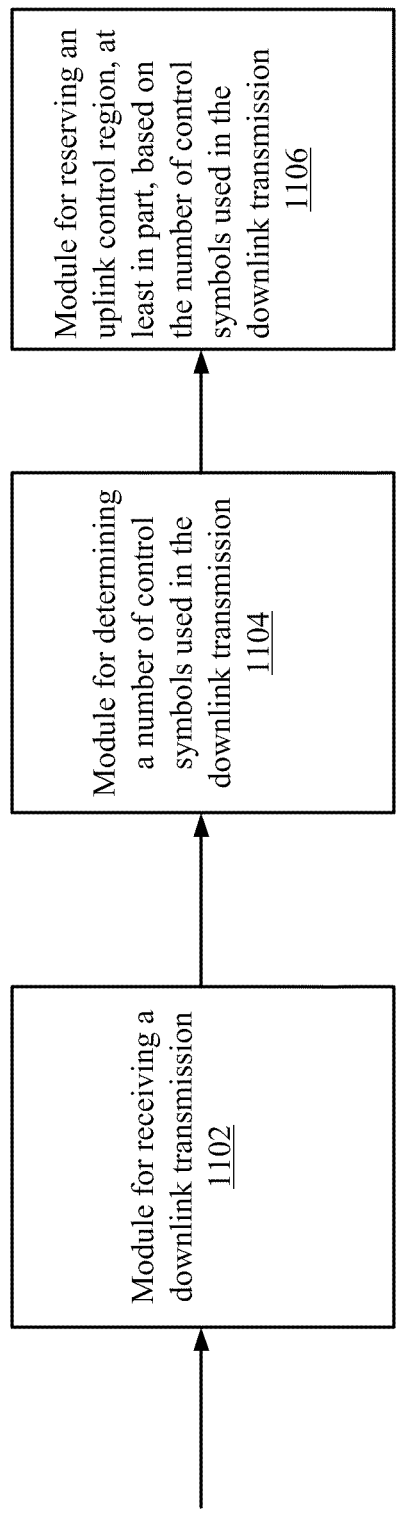
FIG. 11 is a functional block diagram of an exemplary apparatus in a communication system.

FIG. 11 is a functional block diagram of an exemplary access terminal in a communication system. The apparatus 1100 includes a module 1102 for receiving a downlink transmission, a module 1104 for determining a number of control symbols used in the downlink transmission, and a module 1106 for reserving an uplink control region, at least in part, based on the number of control symbols used in the downlink transmission.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method of allocating uplink resources, comprising:
   receiving a downlink transmission, wherein the downlink transmission includes an indicator that specifies the number of control symbols used in the downlink transmission;
   retrieving, from a control symbol mapping table, a resource allocation configuration corresponding to the number of control symbols specified by the indicator; and
   using the resource allocation configuration to reserve an uplink control region.

2. The method of claim 1, wherein the indicator is received on a control channel.

3. The method of claim 1, wherein the resource allocation configuration is used to derive a number of resource blocks to reserve in the uplink control region.

4. The method of claim 3, wherein the uplink control region is within a sub-frame, the method further comprising:
   determining whether the number of resource blocks reserved in the uplink control region is an odd number; and
   upon determining that the number of resource blocks reserved in the uplink control region is an odd number, mapping data symbols offset by one resource block within the sub-frame.

5. The method of claim 3, wherein the number of resource blocks reserved in the uplink control region is an odd number, and wherein the uplink control region is within a sub-frame, the method further comprising:
   receiving an uplink data resource allocation;
   determining whether the data resource allocation is within the same sub-frame as the uplink control region; and
   using a data symbol transmission allocation rule for allocating data symbols to resource blocks in the sub-frame.

6. The method of claim 3, wherein the number of resource blocks reserved in the uplink control region is an odd number, and wherein the uplink control region is within a sub-frame, the method further comprising:
   receiving an uplink data resource allocation;
   determining whether the data resource allocation is completely within the uplink control region; and
   using a control symbol transmission allocation rule for allocating data symbols to resource blocks in the sub-frame.

7. An apparatus for wireless communications, comprising:
   means for receiving a downlink transmission, wherein the downlink transmission includes an indicator that specifies the number of control symbols used in the downlink transmission;
   means for retrieving, from a control symbol mapping table, a resource allocation configuration corresponding to the number of control symbols specified by the indicator; and
   means for reserving an uplink control region using the resource allocation configuration.

8. The apparatus of claim 7, wherein the means for receiving a downlink transmission receives the indicator on a control channel.

9. The apparatus of claim 7, wherein the means for reserving an uplink control region uses the resource allocation configuration to derive a number of resource blocks to reserve in the uplink control region.

10. The apparatus of claim 9, wherein the uplink control region is within a sub-frame, the apparatus further comprising:
    means for determining whether the number of resource blocks reserved in the uplink control region is an odd number; and
    means for mapping data symbols offset by one resource block within the sub-frame if the number of resource blocks reserved in the uplink control region is an odd number.

11. The apparatus of claim 9, wherein the number of resource blocks reserved in the uplink control region is an odd number, wherein the uplink control region is within a sub-frame, and wherein the means for receiving a downlink transmission receives an uplink data resource allocation, the apparatus further comprising:
    means for determining whether the data resource allocation is within the same sub-frame as the uplink control region; and
    means for using a data symbol transmission allocation rule for allocating data symbols to resource blocks in the sub-frame.

12. The apparatus of claim 9, wherein the number of resource blocks reserved in the uplink control region is an odd number, wherein the uplink control region is within a sub-frame, and wherein the means for receiving a downlink transmission receives an uplink data resource allocation, the apparatus further comprising:
    means for determining whether the data resource allocation is completely within the uplink control region; and
    means for using a control symbol transmission allocation rule for allocating data symbols to resource blocks in the sub-frame.

13. An apparatus for wireless communications, comprising:

a receiver configured to receive a downlink transmission, wherein the downlink transmission includes an indicator that specifies the number of control symbols used in the downlink transmission; and a control channel resource allocator configured to:

retrieve, from a control symbol mapping table, a resource allocation configuration corresponding to the number of control symbols specified by the indicator; and use the resource allocation configuration to reserve the uplink control region.

14. The apparatus of claim 13, wherein the receiver is further configured to receive the indicator on a control channel.

15. The apparatus of claim 13, wherein control channel resource allocator is configured to use the resource allocation configuration to derive a number of resource blocks to reserve in the uplink control region.

16. The apparatus of claim 15, wherein the uplink control region is within a sub-frame, the apparatus further comprising a data channel resource allocator configured to:

determine whether the number of resource blocks reserved in the uplink control region is an odd number; and upon determining that the number of resource blocks reserved in the uplink control region is an odd number, map data symbols offset by one resource block within the sub-frame.

17. The apparatus of claim 15, wherein the number of resource blocks reserved in the uplink control region is an odd number, wherein the uplink control region is within a sub-frame, and wherein the receiver is further configured to receive an uplink data resource allocation, the apparatus further comprising a data channel resource allocator configured to:

determine whether the data resource allocation is within the same sub-frame as the uplink control region; and use a data symbol transmission allocation rule for allocating data symbols to resource blocks in the sub-frame.

18. The apparatus of claim 15, wherein the number of resource blocks reserved in the uplink control region is an odd number, and wherein the uplink control region is within a sub-frame, and wherein the receiver is further configured to receive an uplink data resource allocation, the apparatus further comprising a data channel resource allocator configured to:

determine whether the data resource allocation is completely within the uplink control region; and use a control symbol transmission allocation rule for allocating data symbols to resource blocks in the sub-frame.

19. A computer product, comprising:

a non-transitory computer-readable medium, comprising:

code for receiving a downlink transmission, wherein the downlink transmission includes an indicator that specifies the number of control symbols used in the downlink transmission;

code for retrieving, from a control symbol mapping table, a resource allocation configuration corresponding to the number of control symbols specified by the indicator; and code for reserving an uplink control region using the resource allocation configuration.

20. The computer product of claim 19, wherein the code for receiving a downlink transmission receives the indicator on a control channel.

21. The computer product of claim 19, wherein the code for reserving an uplink control region uses the resource allocation configuration to derive a number of resource blocks to reserve in the uplink control region.

22. The computer product of claim 21, wherein the uplink control region is within a sub-frame, the computer-readable medium further comprising:

code for determining whether the number of resource blocks reserved in the uplink control region is an odd number; and code for mapping data symbols offset by one resource block within the sub-frame if the number of resource blocks reserved in the uplink control region is an odd number.

23. The computer product of claim 21, wherein the number of resource blocks reserved in the uplink control region is an odd number, wherein the uplink control region is within a sub-frame, and wherein the code for receiving a downlink transmission receives an uplink data resource allocation, the computer-readable medium further comprising:

code for determining whether the data resource allocation is within the same sub-frame as the uplink control region; and code for using a data symbol transmission allocation rule for allocating data symbols to resource blocks in the sub-frame.

24. The computer product of claim 21, wherein the number of resource blocks reserved in the uplink control region is an odd number, wherein the uplink control region is within a sub-frame, and wherein the means for receiving a downlink transmission receives an uplink data resource allocation, the computer-readable medium further comprising:

code for determining whether the data resource allocation is completely within the uplink control region; and code for using a control symbol transmission allocation rule for allocating data symbols to resource blocks in the sub-frame.

* * * * *